United States Patent

[11] 3,550,613

| [72] | Inventor | Theodore C. Barber |
| --- | --- | --- |
| | | P.O. Box 5, Orovada, Nev. 89425 |
| [21] | Appl. No. | 736,803 |
| [22] | Filed | June 13, 1968 |
| [45] | Patented | Dec. 29, 1970 |

[54] AUTOMATIC FLUID FLOW CONTROL APPARATUS
1 Claim, 6 Drawing Figs.

[52] U.S. Cl. ................................................ 137/113, 200/83
[51] Int. Cl. ..................................................... G05d 11/00
[50] Field of Search ......................................... 137/109–114, 118, 119, 98; 200/83.1(Inquired)

[56] References Cited
UNITED STATES PATENTS

| 2,257,249 | 9/1941 | Thomas | 137/113X |
| --- | --- | --- | --- |
| 2,354,286 | 7/1944 | Whaley | 137/113 |
| 2,686,561 | 8/1954 | Isreeli et al. | 137/113X |
| 2,693,812 | 11/1954 | Jones et al. | 137/113 |
| 2,992,652 | 7/1961 | Fellberg | 137/118 |
| 3,001,541 | 9/1961 | St. Clair | 137/113 |
| 3,033,220 | 5/1962 | St. Clair | 137/113 |
| 3,148,364 | 9/1964 | Engels et al. | 137/118X |
| 3,335,244 | 8/1967 | Mejean et al. | 200/83X |
| 3,398,991 | 8/1968 | Compton | 200/83X |

FOREIGN PATENTS

| 1,310,676 | 10/1962 | France | 137/113 |

Primary Examiner—William F. O'Dea
Assistant Examiner—David J. Zobkiw
Attorney—Drummond, Cahill & Phillips ABSTRACT: Control apparatus for automatically controlling the flow of fuel from two tanks to an engine. A movable diaphragm divides a control chamber into two compartments, each compartment receiving fuel from one of the tanks. Valves are provided in each of the compartments for controlling the flow of fuel through the control chamber to the engine, the operation of each valve being responsive to movement of the diaphragm. Differential pressure on the diaphragm as one tank is emptied causes the diaphragm to change position, automatically opening the closed valve to permit fuel flow from the other tank to the engine.

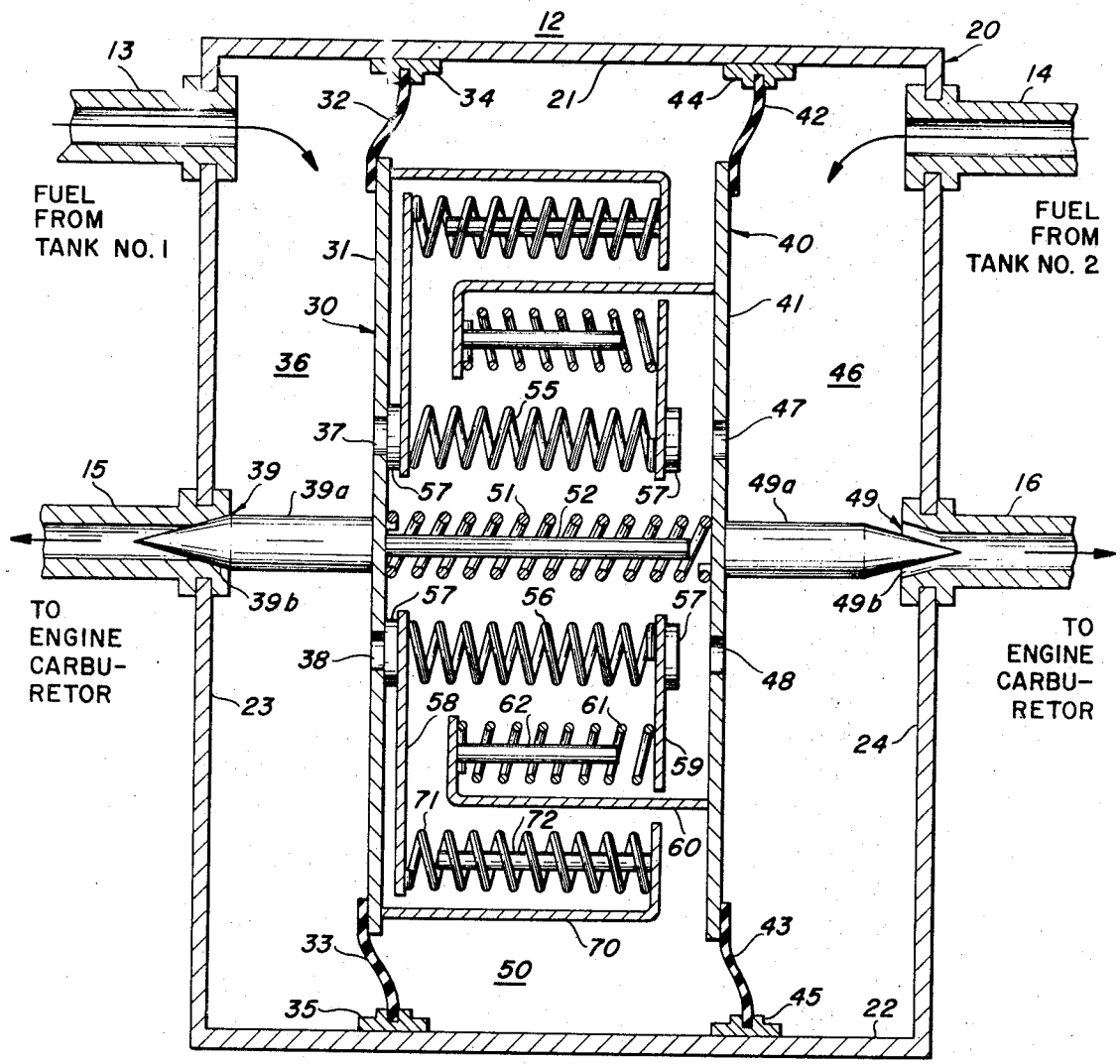
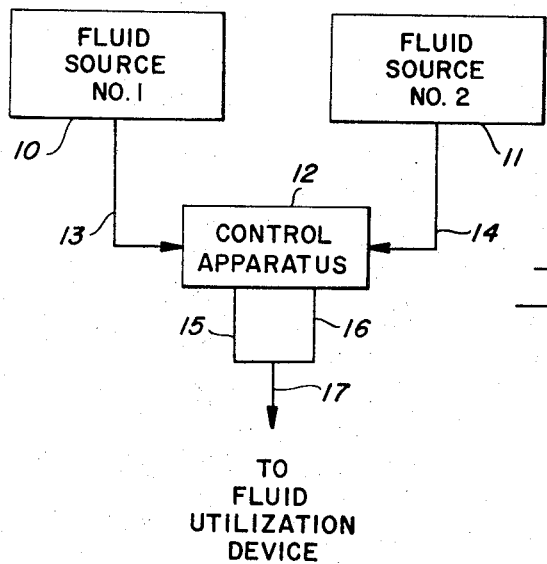

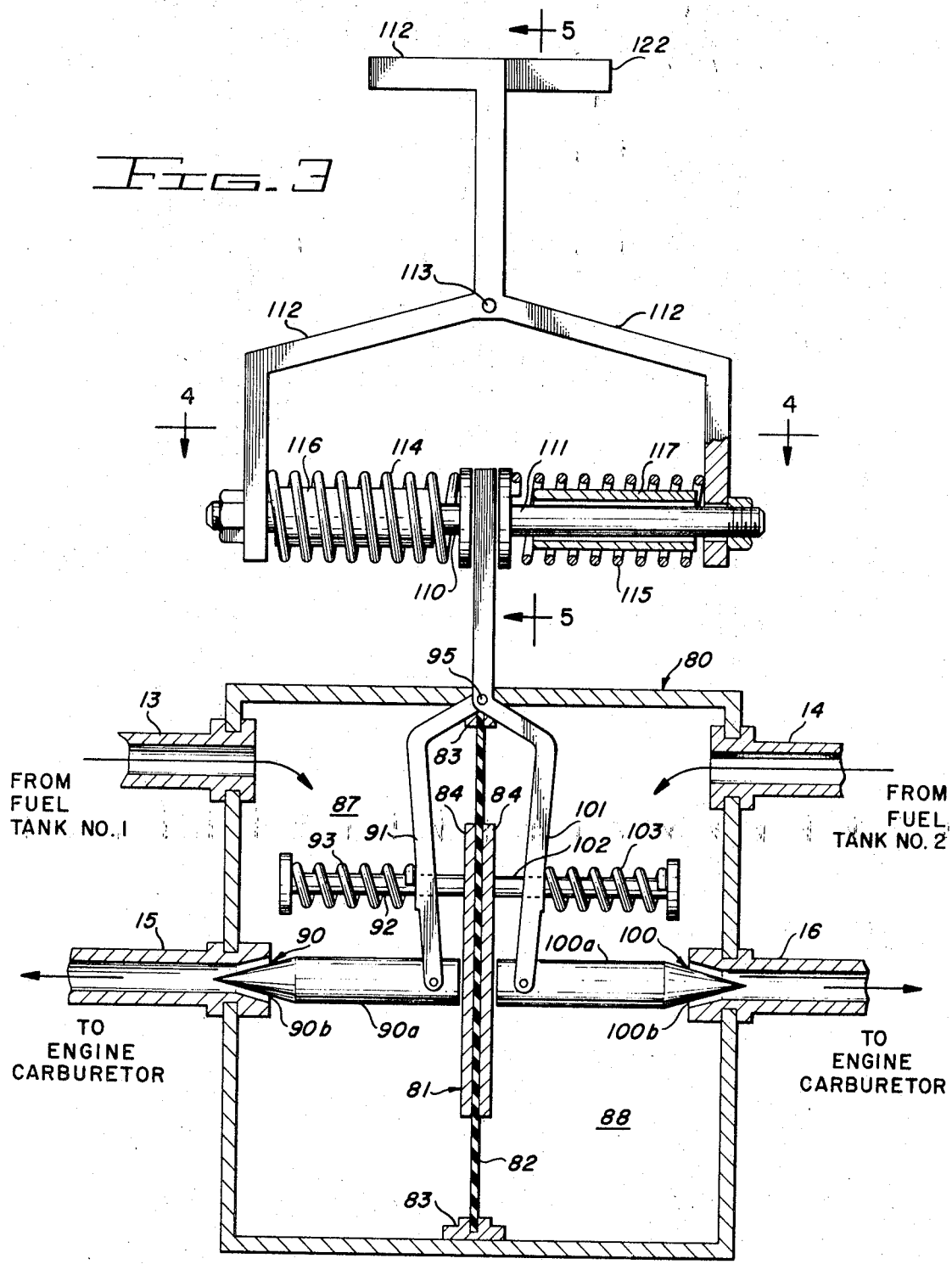

INVENTOR.
THEODORE C. BARBER
BY
Drummond & Cahill
ATTORNEYS

AUTOMATIC FLUID FLOW CONTROL APPARATUS

BACKGROUND OF THE INVENTION

1. Field of the Invention

This invention relates to fluid control apparatus and, in particular, to apparatus for controlling the flow of fluid from a plurality of containers to a utilization device. Specifically, this invention relates to control apparatus for controlling the flow of fuel from one of two tanks or containers to a utilization device, such as an engine, and for automatically initiating the flow of fuel from the other of the two tanks to the utilization device when the one tank is empty.

2. Description of the Prior Art.

In many types of machines and in many kinds of apparatus utilizing an engine or motor, a plurality of fuel tanks are provided and a selection lever controlling the operation of valves is available to permit the operator to use fuel from a selected one of the tanks. For example, in many aircraft, two gasoline tanks are provided and the pilot has the option of switching the flow of gasoline to the airplane engine from one or the other of the tanks. However, due to neglect, inadvertence, or inattention, the pilot may allow one of the tanks to run dry without operating the valve to permit fuel flow from the other tank to the engine, causing the engine to stop and resulting in loss of power. In many circumstances, such loss of power may be dangerous or may cause an accident. Accordingly, it is desirable to prevent interruption of fuel flow to the engine when one fuel tank is exhausted but fuel is available in another tank.

It is therefore an object of this invention to provide control apparatus for automatically initiating fluid flow from a second source to a utilization device when fluid flow from a first source to the utilization device is terminated.

It is another object of this invention to provide automatic fluid flow control apparatus in a multisource fluid system.

It is a further object of this invention to provide control apparatus in a two-tank fuel system for automatically initiating fuel flow from the second tank to the engine when the fuel in the first tank is exhausted.

SUMMARY OF THE INVENTION

The foregoing objects are achieved, in accordance with the illustrated embodiments of the invention, by providing a control chamber and conduit means connecting each of two fluid sources and the fluid utilization device to the control chamber. A diaphragm is positioned in the chamber and divides the chamber into two compartments, one compartment having the conduit from the first fluid source connected thereto, and the other compartment having the conduit from the second fluid source connected thereto. A fluid flow path is provided from each compartment through conduit to the fluid utilization device. The differential pressure on the diaphragm due to the presence or absence of fluid in the compartments of the chamber permits fluid flow from one of the sources to the utilization device to be initiated when fluid from the other source is exhausted.

In one of the illustrated embodiments of the invention, valves are positioned in each of the compartments of the control chamber, the opening and closing of the valves being a function of the position of the movable diaphragm within the control chamber. The diaphragm is initially positioned so that one valve is closed and the other is open to permit fluid flow through the latter to the utilization device. As the fluid from the source associated with the open valve is exhausted, the fluid pressure in the corresponding compartment decreases and the diaphragm moves to open the valve in the other compartment, permitting fluid flow from the other source to the utilization device.

In another embodiment of the invention, the movable diaphragm is similarly responsive to differential pressure in the control chamber and movement of the diaphragm serves to control the opening and closing of contacts in order to energize or deenergize pumps associated with the fluid sources.

BRIEF DESCRIPTION OF THE DRAWINGS

The subject matter of the invention is particularly pointed and distinctly claimed in the concluding portion of the specification. The invention, however, both as to organization and the method of operation, may best be understood by reference to the following description taken in connection with the accompanying drawings, in which:

FIG. 1 illustrates diagrammatically a fluid system including fluid flow control apparatus;

FIG. 2 illustrates in section an embodiment of the fluid flow control apparatus taken along the line 4-4 of the invention;

FIG. 3 illustrates in section another embodiment of the fluid flow control apparatus taken along the line 5-5 of the invention;

DESCRIPTION OF THE PREFERRED EMBODIMENT

Figure 4:
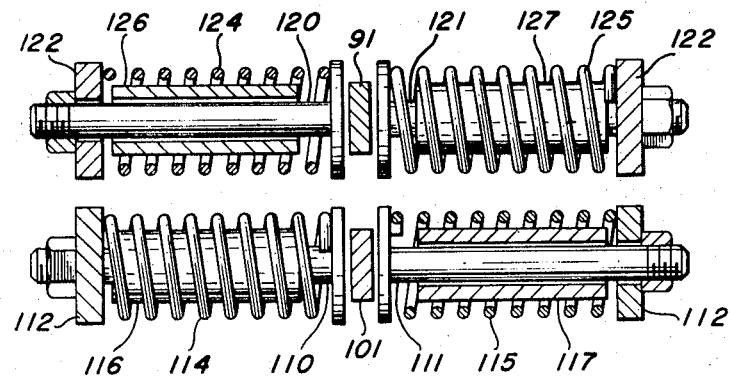
FIG. 4 is a sectional view of the selector portion of the apparatus of FIG. 3.

FIG. 1 illustrates diagrammatically a system incorporating the fluid flow control apparatus. Referring to FIG. 1, fluid source number one and fluid source number two, identified by reference numerals 10 and 11 respectively, which may comprise containers or tanks, provide fluid to control apparatus 12 through lines 13 and 14 respectively. Control apparatus 12 permits fluid to flow from either source number one or source number two through lines 15 and 16 respectively and then through common line 17 leading to the fluid utilization device. Lines 13—17 may comprise pipes or conduits. The initial fluid flow path from either source number one or source number two through control apparatus 12 to the fluid utilization device may be controlled by a selector device actuated by an operator. In accordance with the invention, control apparatus 12, upon termination of fluid flow from the selected source to the fluid utilization device, for example due to emptying of the container, automatically initiates the flow of fluid from the other source so that a constant fluid supply is provided to the fluid utilization device. In the system of FIG. 1, the fluid may consist of fuel, fluid sources number one and number two may consist of tanks having a predetermined capacity, and the fluid utilization device may be an engine such as employed in an aircraft.

FIG. 2 illustrates an embodiment of the control apparatus of the invention. Referring to FIG. 2, control apparatus 12 comprises a chamber 20, illustrated in section, having conduits 13 and 14 from fluid sources number one and number two respectively connected to opposite sides of chamber 20 to permit fuel flow into chamber 20. For purposes of the embodiment illustrated in FIG. 2, it is assumed that fluid sources number one and number two comprise fuel tanks and that the utilization device is an aircraft engine. Conduits 15 and 16 connected to opposite sides of chamber 20 are connected to a common conduit 17 (not shown) which leads to the engine carburetor to provide fuel flow paths from chamber 20 to the engine.

Chamber 20 is a fluid-tight chamber formed of any suitable material, for example steel, comprising top member 21, bottom member 22, left and right wall members 23 and 24 respectively, and suitable front and back members. Chamber 20 is divided into three compartments by diaphragms 30 and 40, as illustrated in FIG. 2. Diaphragm 30 comprises rigid plate 31 and flexible support members 32 and 33 attached to plate 31. Flexible support members 32 and 33 are attached to the top and the bottom members 21 and 22 of chamber 20 by means of brackets 34 and 35. Compartment 36 is formed in chamber 20 between diaphragm 30 and left wall member 23.

Plate 31 of diaphragm 30 has openings 37 and 38 formed therein. Needle valve 39 is provided in compartment 36 to control the flow of fuel from compartment 36 through conduit 15 to the engine carburetor. Needle valve 39 comprises needle member 39a attached to rigid plate 31 of diaphragm 30 and valve seat 39b formed at the junction of conduit 15 and left wall member 23 of chamber 20.

If fuel is present in fuel tank number one, the fuel flows through conduit 13 into chamber 36. The fuel in chamber 36 flows into conduit 15 to the engine carburetor if diaphragm 30 has moved to the right, opening needle valve 39. Conversely, if diaphragm 30 has moved to the left, needle valve 39 is closed, preventing fuel flow from chamber 36 into conduit 15.

Diaphragm 40 is identical to diaphragm 30 and comprises rigid plate 41 which is mounted in chamber 20 by means of flexible support members 42 and 43 and brackets 44 and 45. As with diaphragm 30, flexible support members 42 and 43 permit rigid plate 41 to move to the left or right within chamber 20. Compartment 46 is formed in chamber 20 between diaphragm 40 and right wall member 24.

Rigid member 41 of diaphragm 40 has openings 47 and 58 formed therein. Needle valve 49 is provided in compartment 46 and comprises needle member 49a and valve seat 49b formed at the junction of conduit 16 and wall member 24 of chamber 20, as illustrated in FIG. 2. Needle member 49a of needle valve 49 is mounted on rigid plate 41 of diaphragm 40. Needle valve 49 controls the flow of fuel from tank number two through compartment 46 into conduit 16.

Compartment 50 is formed in chamber 20 between diaphragms 30 and 40, as shown in FIG. 2. Mainspring 51 is positioned in compartment 50 between rigid plates 31 and 41 of diaphragms 30 and 40 respectively and exerts an outward force of approximately one pound on each of the diaphragms, tending to close the corresponding needle valves. Solid rod 52 is mounted on rigid plate 31 and extends toward rigid plate 41, as illustrated.

Auxiliary springs 55 and 56 are also provided in compartment 50, each capable of exerting a force of approximately one-half pound. Valve washers 57 are attached to each end of auxiliary spring 55. Members 58 and 59 in addition to valve washers 57 are attached to opposite ends of auxiliary spring 56, as illustrated. The positions of auxiliary springs 55 and 56 within compartment 50 of chamber 20 are controlled by a fuel selector lever (not shown). The fuel selector lever causes auxiliary springs 55 and 56 to assume the same relative positions with respect to diaphragms 30 and 40.

Member 60 is attached to rigid plate 41 of diaphragm 40 and extends in compartment 50 toward diaphragm 30, the end of the member 60 being spaced from diaphragm 30, as illustrated in FIG. 2. Spring 61 is positioned between member 59 and the end of member 60 with rigid rod 62 being mounted on the end of member 60 and extending toward member 59.

Similarly, member 70 is mounted on rigid plate 31 of diaphragm 30 and extends in compartment 50 toward diaphragm 40, the end of member 70 being spaced from diaphragm 40, as illustrated in FIG. 2. Spring 71 is positioned between member 58 and the end of member 70 with rigid rod 72 being mounted on the end of member 70 and extending toward member 58. Springs 61 and 71 are each capable of exerting a force of approximately 1½ pounds.

The fuel selector level may have four positions so that:

a. needle valve 39 is open and needle valve 49 is closed, permitting fuel flow from tank number one and preventing fuel flow from tank number two to the engine; however, when tank number one is empty, needle valve 49 is automatically opened to permit flow of fuel from tank number two to the engine.

b. needle valve 49 is open and needle valve 39 is closed to permit fuel flow from tank number two and to prevent fuel flow from tank number one to the engine; however, when tank number two is empty, needle valve 39 is automatically opened to permit fuel flow from tank number one to the engine.

c. both needle valves 39 and 49 are opened to permit fuel flow from both tank number one and tank number two to the engine.

d. both needle valve 39 and needle valve 49 are closed to prevent fuel flow from both tank number one and tank number two to the engine.

In operation, assuming that both tanks number one and number two contain fuel and that the fuel selector lever has been positioned to permit fuel flow from tank number two and to prevent fuel flow from tank number one to the engine, the initial positions of springs 55 and 56 and of diaphragms 30 and 40 are as illustrated in FIG. 2. The fuel selector lever causes the right ends of auxiliary springs 55 and 56 to be spaced from diaphragm 40 and permits the left ends of springs 55 and 56 to extend toward diaphragm 30 so that valve washers 57 close openings 37 and 38 in rigid plate 31. Compartments 36 and 46 are filled with fuel and fuel flows through openings 47 and 48 in diaphragm 40 to fill compartment 50. The force exerted by springs 51, 55, and 56 against diaphragm 30 cause needle member 39a to be positioned against valve seat 39b to block fuel flow from compartment 36 into conduit 15. The pressure of the fuel in compartment 36 against the left side of diaphragm 30 is balanced by the pressure of the fuel in compartment 50 against the right side of diaphragm 30. Spring 61 exerts a force on diaphragm 40 of 1½ pounds to the left, overcoming the one pound force to the right exerted by spring 51 on diaphragm 40 to cause needle valve 49 to remain open. The fuel pressures on the opposite sides of diaphragm 40 balance. Thus, fuel flows from tank number two through chamber 46 and into conduit 16 to the engine carburetor.

When fuel tank number two is empty, the fuel levels in compartments 46 and 50 decrease with corresponding decrease in the fuel pressure against diaphragm 30. The pressure in compartment 36 remains constant. This pressure imbalance causes diaphragm 30 to move to the right, causing rigid rod 52 to contact plate 41. Fuel pressure in compartment 36 overcomes the force of spring 51 and rod 52 moves diaphragm 40 to the right. The movement of both diaphragms 30 and 40 to the right opens needle valve 39 and closes needle valve 49, permitting fuel flow from tank number one through compartment 36 into conduit 15 to the engine carburetor. Thus, in accordance with the invention, automatic valve actuation occurs to permit continuous flow of fuel to the engine.

If the fuel selector lever is initially positioned to permit fuel flow from bank number one and to prevent fuel flow from tank number two to the engine, the left ends of springs 55 and 56 are positioned to be spaced from diaphragm 30 so that openings 37 and 38 are not blocked by valve washers 57. Valve washers 57 on the right ends of springs 55 and 56 close openings 47 and 48 in diaphragm 40. The initial positions of diaphragms 30 and 40 are opposite that shown in FIG. 2 are needle valve 49 is initially closed and needle valve 39 is initially opened. As the fuel in tank number one is depleted, the pressure differential in chamber 20 causes diaphragms 30 and 40 to move to the left to open needle valve 49 in a manner analogous to that of the preceding description.

If the fuel selector lever is positioned to permit fuel flow from both tanks to the engine, both the left and rights ends of auxiliary springs 55 and 56 are positioned by the lever to be spaced from diaphragms 30 and 40 respectively. The forces exerted by springs 61 and 71 on diaphragms 30 and 40 to overcome mainspring 51 causes both diaphragms to move toward the center of the chamber, opening both needle valves 39 and 49. If the fuel selector lever is initially positioned to prevent fuel flow from both tanks, the left ends of auxiliary springs 55 and 56 are permitted to exert a force on diaphragm 30 and the right ends of auxiliary springs 55 and 56 are permitted to exert a force on diaphragm 40. The combined forces of springs 55, 56, and 51 causes both needle valves 39 and 49 to close.

Figure 5:
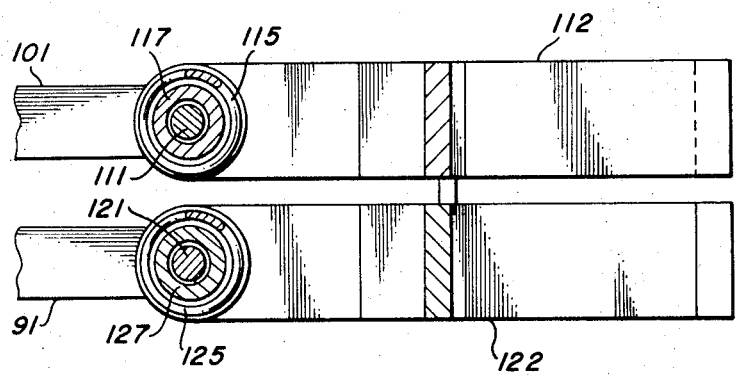
FIG. 5 is a sectional view of the selector portion of the control apparatus of FIG. 3.

FIGS. 3, 4, and 5 illustrate a preferred embodiment of the fluid control apparatus of the invention wherein most of the spring mechanism is external to the control chamber. Referring to these figures, chamber 80 receives conduits 13 and 14 from fuel tanks number one and two respectively. Conduits 15 and 16 are also connected between chamber 80 and the engine. Chamber 80 is divided into two compartments by diaphragm 81 comprising a flexible member 82 attached to the top and bottom walls of chamber 80 by means of brackets 83 and rigid plates 84 mounted on opposite sides of flexible member 82, as illustrated. Conduits 13 and 15 communicate with compartment 87 formed between diaphragm 81 and the left wall of chamber 80. Similarly, conduits 14 and 16 communicate with compartment 88 formed between diaphragm 81 and the right wall of chamber 80. Compartment 87 contains needle valve 90 comprising needle member 90a and valve seat 90b formed at the junction of conduit 15 and the left wall of chamber 80. Needle member 90a is pivotally connected to member 91 so that movement of member 91 causes needle member 90a to move either toward or away from valve seat 90b. Member 92 is rigidly mounted on plate 84 and extends beyond member 91 into compartment 87. Spring 93 is positioned between the enlarged end of member 92 and the surface of member 91 and exerts a force on member 91, urging the end of member 91 attached to needle member 90a toward diaphragm 81. Member 91 is pivoted at point 95 and extends through the top of chamber 80.

Compartment 88 contains valve 100 comprising needle member 100a and valve seat 100b formed at the junction of conduit 16 and the right wall of chamber 80. Needle member 100a is pivotally connected to member 101, as illustrated. Member 102 is rigidly mounted on plate 84 of diaphragm 81 and extends beyond member 101 into compartment 88. Spring 103 is positioned around member 102 and extends between the enlarged end of member 102 and the surface of member 101. Member 101 is pivoted at point 95 and extends through the top of chamber 80.

The end of member 101 is positioned between the enlarged ends of oppositely-disposed members 110 and 111, as illustrated. Members 110 and 111 are mounted between the extended arms of selector lever 112 which is pivoted at point 113. Springs 114 and 115 are mounted on members on members 110 and 111, as illustrated. Spacer tubes 116 and 117 are also mounted on members 110 and 111 respectively, as illustrated, and are movable along members 110 and 111 under springs 114 and 115.

The upper end of member 91 is similarly positioned between the enlarged ends of oppositely-disposed members 120 and 121. Members 120 and 121 are mounted on opposite arms of selector lever 122 which is pivoted at point 113. Springs 124 and 125 are mounted on members 120 and 121 respectively and extend between the enlarged ends of members 120 and 121 and the corresponding arms of selector lever 122. Spacer tubes 126 and 127 are also positioned on members 120 and 121 and are movable along members 120 and 121 under springs 124 and 125. Springs 93 and 103 are selected to be stronger, that is, exert a greater axial force, than springs 114, 115, 124 or 125.

In operation, when the selector levers 112 and 122 are moved to the left, needle valve 90 is closed and needle valve 100 is opened, preventing fuel flow from tank number one and permitting fuel flow from tank number two to the engine. Both compartments 87 and 88 are filled with fuel and the forces exerted by the fuel on opposite sides of diaphragm 81 cancel. When fuel tank number two becomes empty, the fuel level in compartment 88 drops and the differential pressure causes diaphragm 81 to move to the right. Because spring 93 is stronger than spring 124, needle member 90a follows diaphragm 81, opening needle valve 90 and permitting fuel flow from tank number one to the engine. Thus, the control apparatus of FIGS. 3—5 automatically switches from the empty to the full tank to provide a continuous fuel supply to the engine.

If the selector lever is initially moved to the right, with both fuel tanks containing fuel, needle valve 100 is closed and needle valve 90 is open. When tank number one is emptied, diaphragm 81 and needle member 100a move to the left due to differential pressure in chamber 80 to open needle valve 100 and permit fuel flow from tank number two to the engine.

Both needle valve 90 and needle valve 100 may be closed simultaneously by moving selector lever 112 to the right and simultaneously moving selector lever 122 to the left. The movement of lever 112 to the right compresses spring 115 until spacer tube 117 strikes the enlarged end of member 111, causing member 111 to pivot, compressing spring 103 and closing needle valve 100. Similarly, the movement of selector lever 122 to the left compresses spring 124 until spacer tube 126 contacts the enlarged end of member 120. The resultant movement of member 120 pivots member 91, moving valve 90 to a closed position. Both needle valves may be opened simultaneously by positioning the selector levers in the neutral position. Suitable detents are provided for retaining the selector levers in the selected positions.

Figure 6:
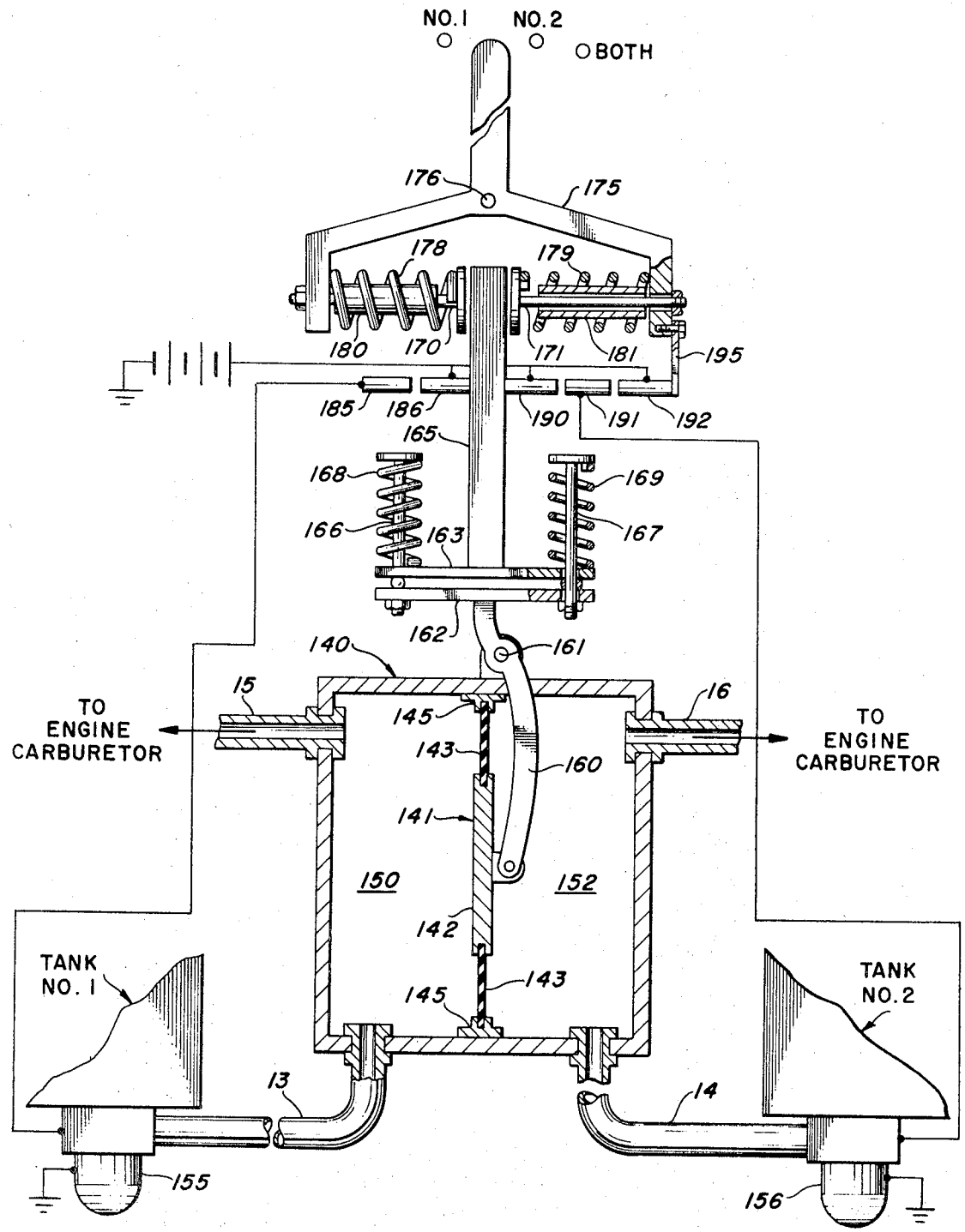
FIG. 6 illustrates another embodiment of the fluid flow control apparatus of the invention.

FIG. 6 illustrates a third embodiment of the control apparatus of the invention which is employed in conjunction with fuel tanks having electric fuel pumps. Referring to FIG. 6, a chamber 140 is provided, chamber 140 being divided into two compartments by diaphragm 141 comprising rigid plate 142 and flexible support members 143. Flexible members 143 are attached to the top and bottom walls of chamber 140 by brackets 145. Conduits 13 and 15 communicate with left compartment 150 of chamber 140 while conduits 14 and 16 communicate with right chamber 152 of chamber 140. Fuel flow from tank number one through conduit 13 into compartment 150 occurs when electric fuel pump 155 is energized. Similarly, fuel flow from tank number two through conduit 14 into compartment 152 occurs when electric fuel pump 156 is energized.

Lever 160 is pivotally attached at its lower end to rigid plate 142 of diaphragm 141, as illustrated, and passes through the top of chamber 140. Lever 160 is pivoted at point 161 just above the top of chamber 140 and has its upper end rigidly attached to plate 162.

Rigid plate 163 is spaced slightly above plate 162 and is rigidly attached to lever 165. As illustrated in FIG. 6, members 166 and 167 pass through openings in plates 162 and 163, the diameter of the openings in plates 163 being larger than the diameter of members 166 and 167. Springs 168 and 169 are mounted between the upper surface of plate 163 and the enlarged ends of members 166 and 167. Springs 168 and 169 exert a downward force on plate 163.

The upper end of lever 165 is positioned between the enlarged ends of oppositely-disposed members 170 and 171. Members 170 and 171 are mounted on the opposite arms of fuel selector lever 175, as illustrated. Selector lever 175 is pivoted at point 176. Springs 178 and 179 are positioned between the enlarged ends of members 170 and 171 and the oppositely-disposed ends of selector lever 175. Spacer tubes 180 and 181 are movable mounted on members 170 and 171 respectively beneath springs 178 and 179.

Energization of fuel pump 155 occurs when electrical contacts 185 and 186 are closed. Contact 186 is mounted on lever 165 while contact 185 is mounted on a suitable structure so as to be slightly spaced from contact 186 when lever 165 is in its intermediate position. Contacts 185 and 186 are connected in series with fuel pump 155 and a suitable source of electrical power, as known in the art, so that the circuit from the power source to fuel pump 155 is closed and fuel pump 155 is energized when contacts 185 and 186 are closed.

Electric fuel pump 156 is energized either upon closure of contacts 190 and 191 or contacts 191 and 192. Contact 190 is mounted on lever 165 while contacts 191 is mounted on a suitable structure so as to be spaced slightly from contact 190 when lever 165 is in its intermediate position. Contact 192 is mounted on member 195 attached to fuel selector lever 175, as illustrated, contacts 191 and 192 being slightly separated when selector lever 175 is in its intermediate position. Contact pairs 190, 191, and 191, 192 are suitably connected between a source of electrical power and fuel pump 156 so that upon closure of contacts 190 and 191 or 191 and 192, fuel pump 156 is energized from the power source, as known in the art.

In operation, when fuel selector lever 175 is in its intermediate position, as shown in FIG. 6, neither fuel pump 155 nor fuel pump 156 is energized and no fuel is provided to the engine. When the upper end of selector lever 175 is moved to the left to position number one, the enlarged end of member 170 contacts the upper end of lever 165 and spring 178 is compressed as the upper end lever 165 is moved to the right, closing contacts 190 and 191. Lever 160 is simultaneously pivoted about point 161 to move diaphragm 141 to the left. As fuel pump 156 pumps fuel from tank number two, compartment 152 is filled and fuel flows through conduit 16 to the engine carburetor.

The upper end of fuel selector lever 175 may now be moved to the right to position number two. The enlarged end of member 171 contacts the upper end of lever 165, compressing spring 179. However, lever 165 does not move and contacts 190 and 191 remain closed to energize fuel pump 156 because the fuel pressure in compartment 152 prevents movement of diaphragm 141. Fuel thus continues to flow from tank number two to the engine. When the fuel in tank number two is exhausted, the fuel pressure in compartment 152 diminishes and the force of spring 179 against the upper end of lever 165 causes lever 165 to move to the left, moving lever 160 and diaphragm 141 to the right. Contacts 185 and 186 close to energize fuel pump 155 and provide fuel from tank number one to the engine. Thus, fuel flow is continually provided to the engine even though the first selected tank is empty.

If the upper end of fuel selector lever 175 is initially moved to position number one and then to position number two, fuel flow is initially from tank number one to the engine and fuel pump 156 is automatically energized to provide fuel flow from tank number two when tank number one becomes empty. If the operator wishes to terminate fuel flow from one tank and initiate fuel flow from the other tank prior to the one tank becoming empty, he simply moves the upper end of the fuel selector lever slightly beyond the number one or number two positions so that the appropriate spacer tube 180 or 181 contacts the enlarged end of member 170 or 171 respectively, forcing lever 165 to move in the appropriate direction. Because of the fuel pressure in chamber 140, diaphragm 141 and lever 160 do not move, but plate 163 pivots with respect to plate 162, compressing the appropriate spring 168 or 169 and permitting closure of the contacts corresponding to the fuel pump associated with the other tank.

If the operator desires fuel flow from both tanks to the engine, the upper end of fuel selector lever 175 is moved to the position "both" to cause closure of contact pair 185, 186 as well as contact pair 191, 192, thereby energizing both fuel pump 155 and fuel pump 156. A suitable detent mechanism is provided for retaining the selector lever in the selected position.

As will be apparent to those skilled in the art, it is within the contemplation of the present invention to provide means for visually indicating to the operator of the vehicle the tank or combination of tanks being used at any given time. However, the exact means for providing such a visual indication are not critical in the practice of the invention and it is considered that suitable means may be selected by persons skilled in the art.

There has been described herein fluid flow systems embodying the present invention. Although the principles of the invention have been made clear in illustrative embodiments, there will be immediately obvious to those skilled in the art many modifications in structure, arrangement, proportions, elements, materials and components used in the practice of the invention, and otherwise, which are particularly adapted for specific environments or operating requirements. The appended claims are therefore intended to cover and embrace any such modifications, within the limits only of the true spirit and scope of the invention.

I claim:

1. In an aircraft engine fuel system, including:

first and second liquid fuel tanks;

first and second fuel pumps respectively associated with said tanks for withdrawing liquid fuel therefrom and for supplying said fuel under pressure to an engine fuel-metering system;

control means for manually selecting the fuel flow path from said tanks to said metering system according to three modes of operation:

a first mode of operation in which fuel may be withdrawn from only one of said tanks;

a second mode of operation in which fuel may be withdrawn from both tanks simultaneously; and a third mode of operation in which the fuel flow from both tanks may be interrupted simultaneously; and the improvements in said control means whereby when fuel is being withdrawn from only one of said tanks in said first mode of operation, the fuel flow path is automatically changed responsive to loss of fuel pressure to withdraw fuel from the other of said tanks and maintain fuel flow to said fuel metering system, which improvements in said control means comprise, in combination:

a. a control chamber disposed intermediate said fuel pumps and said engine fuel-metering system;

b. conduit means connecting each of the fuel tanks and the engine fuel-metering system to said control chamber;

c. automatic diaphragm control means mounted in said control chamber responsive in said first mode of operation when fuel is being withdrawn from a manually selected one of said tanks to automatically withdraw fuel from the other of said tanks in response to loss of fuel pressure from said manually selected tank; and d. manual control means mechanically interconnected with said diaphragm control means for initially selecting the fuel flow path from said tanks to said metering system according to any of said first, second and third modes of operation.